United States Patent [19]

Asahi

[11] Patent Number: 5,404,440
[45] Date of Patent: Apr. 4, 1995

[54] METAPHOR ENVIRONMENT CONTROL SYSTEM

[75] Inventor: Nobuo Asahi, Tokyo, Japan

[73] Assignee: Institute for Personalized Information Environment, Tokyo, Japan

[21] Appl. No.: 911,730

[22] Filed: Jul. 10, 1992

[30] Foreign Application Priority Data

Jul. 17, 1991 [JP] Japan .................. 3-176356

[51] Int. Cl.$^6$ .................................. G06F 3/00
[52] U.S. Cl. ..................... 395/155; 395/700; 395/159
[58] Field of Search ............... 395/155, 159, 160, 157, 395/156, 700, 76, 62, 77, 68, 63

[56] References Cited

U.S. PATENT DOCUMENTS

| 4,692,858 | 9/1987 | Redford et al. | 395/157 |
|---|---|---|---|
| 4,866,638 | 9/1989 | Cosentino et al. | 395/159 |
| 5,041,992 | 8/1991 | Cunningham et al. | 395/155 X |
| 5,119,475 | 6/1992 | Smith et al. | 395/156 |
| 5,121,478 | 6/1992 | Rao | 395/157 |
| 5,179,700 | 1/1993 | Aihara et al. | 395/157 X |
| 5,202,828 | 4/1993 | Vertelney et al. | 395/159 X |
| 5,228,123 | 7/1993 | Heckel | 395/155 |
| 5,327,529 | 7/1994 | Fults et al. | 395/155 |

Primary Examiner—Raymond J. Bayerl
Attorney, Agent, or Firm—Armstrong, Westerman, Hattori, McLeland Naughton

[57] ABSTRACT

A metaphor environment control system of human interfaces of any application program for computers, which represents a plurality of metaphors that express various functions of the application program and presents a user with a pertinent function according to the user's operations.

5 Claims, 7 Drawing Sheets

| From | To | Number of cycles | Probability frequency |
|---|---|---|---|
| CR-1 | CR-k | | |
| | CR-m | | |
| | ⋮ | | |
| CR-i | ⋮ | | |
| CR-n | | | |

METAPHOR ENVIRONMENT CONTROL SYSTEM

BACKGROUND OF THE INVENTION

The present invention relates generally to human interfaces of any application program for computers and more particularly to a metaphor environment control system which displays a plurality of metaphors representative of various functions of the application program and presents relevant functions according to a user's operations.

Important for the human interfaces of computer systems is to build system images easily appreciable by users. In recent years, it has often been pointed out that metaphors are efficacious for building these system images and various efforts have been made to implement metaphors.

However, it has generally been indicated that metaphor interfaces have the following problems:
 (1) Mapping between a function group and metaphors provided by applications is still less than perfect.
 (2) A single metaphor fails to cover many functions.
 (3) In some cases, metaphors that the designers consider relevant may be irrelevant to users.
 (4) New functions cannot be expressed by known metaphors alone.

A leading cause of the problems involved with such metaphor interfaces appears to be due largely to the fact that conventional metaphor interfaces are implemented without taking into account the mechanism of how humans understand metaphors.

In general, the mechanism of how humans understand metaphors is modeled by partial mapping of the structurally modeled object to be recognized, as represented by Gentner's structure-mapping theory.

In the case of metaphor interfaces, this partial mapping takes place between a task domain provided by an application and an object represented as a metaphor interface. There are two subjects who perform this mapping: one designer and one user. The problems mentioned above arise when the two subjects make the mapping differently.

Applicant has already come up with a system incorporating a television metaphor environment which allows a user to receive information in the sense of seeing a TV news program (Japanese Patent Application Nos. Hei. 2-154724 and Hei. 2-154725). The general construction of that system is diagrammatically illustrated in FIGS. 1A and 1B.

An information-presenting system incorporating the TV metaphor environment is built up of a computer 21 (e.g., Personal Computer PC9801RX made by NEC), an electronic voice utterance device 22, a mouse 23, a modem 24 and a telephone line 25 as hardware and a script interpreter operating on, e.g., MS-DOS and a script description file giving commands to this, as illustrated in FIG. 1A. This system achieves an environment allowing a user to see news programs by operating the TV metaphor through the electronic voice utterance device 22 and display 26. Data available to this end, for instance, include not only "Mainichi Sinbun On-Line News Flashes", "Mainichi Sinbun On-Line Local News", "The Nationwide Weather Forecast", all served by NIFTY-Serve, and data acceptable from other personal computer networks, but General-purpose data as well. An example of information presentation on the screen is illustrated in FIG. 1B.

The functionality needed Generally for the information presentation system above are largely broken down into a portion constituting the TV metaphor environment and communication function.

The television metaphor environment is made up of four metaphors: the TV set, VTR controller, news program and program guidance, which are specified by independent scripts.

In the TV set and VTR controller scripts, it is described how the states in the TV set and the program should change when those metaphors are operated. For instance, state changes that occur when the user presses the power switch, volume or channel button is described. In the news program script, the flow of a news program and its rules are described regarding how the data of a personal computer network, e.g., NIFTY-Serve, is constructed and presented as a news program, for instance, how the input data is processed and presented, and in the program guidance script, the structure and rules of program guidance are described. The scripts of these metaphors are stored in a script file, which is read and operated by the script interpreter.

The communication functionality is specified by a script describing how the communication functions of the script interpreter (that are able to handle selected data input from RS232C as an event and transmit the data) communicate with the personal computer network, e.g., NIFTY-Serve.

In the information-presenting system, the TV set 31 and the VTR controller 32 are always displayed on the display screen, as illustrated in FIG. 1B. And, with some exceptions, the power switch 33, channel button 34 and volume button 35 of the TV set 31 and the respective buttons (36–41) of the VTR controller 32 are operable on every scene, and operations on these are called the basic operations. In addition, some metaphors appearing on a CRT 42 can be operated on particular scenes.

The television metaphor environment mentioned above may be designed to present information in newspaper format suitable for browsing or, in the alternative, in TV program format suitable for grazing. At this time, the rules for interpreting the user's operation are left to the designer, but in consideration of plural users and a variety of applications, it is difficult to set down those interpretive rules unequivocally. For instance, the operation that the user presses the fast-forward button of the VTR may be taken as an action of turning the pages of a newspaper in the context that representation is in newspaper format and as an action of fast picture search in the context that representation is in television program format. Furthermore, the operation that the user presses the play button of the VTR may be interpreted as a request for still pictures to be moved in the context that the user sets an eye on a photograph in a certain news item. Possibly, a metaphor of a clock may be used for fast picture search as well. Thus, the VTR's fast-forward button corresponds to plural meanings of "turning the pages" and "fast picture search", and so this is called a "equivocal metahor". Fast picture search, on the other hand, corresponds to the metaphor of the fast-forward button of the VTR and the metaphor of the watch, and so these are called "synonymic metapors". Ambiguities inherent in the equivocal and synonymic metaphors must be resolved so as to follow the user's context, knowledge, intention and preferences.

Applicant has also come up with a metaphor environment control mechanism which enables adaptive actions for an individual user to be implemented from the same condition and event (Japanese Patent Application No. Hei. 2-154260).

Referring to FIG. 2, rule bases 51-1 ... 51-n set down rules regarding status transition for each metaphor, and a working memory 54 stores information about relations among the metaphors as well as status transitions and other states of the metaphors. An input/output control means 53 controls inputs and outputs between a display, a mouse and a voice utterance device, and a function call means 55 calls a certain function of the application. A rule base control means 52 is operable to rewrite the information stored in the working memory 54 with reference to the rule bases 51-1, ... 51-n, place the function call means 55 under control and control the input/output control means 53, thereby implementing status transitions of the metaphors.

Referring first to how to construct and control the metaphor environment, one metaphor is constructed as one production system having several states, and the rules of the production system are such that states and events are defined as the left side and actions as the right side. The events include the user's operations, messages from other metaphors, timer events, etc. The actions have three kinds of control:status control, picture control and function call. Said status control gives rise to a change in a metaphor itself, said picture control triggers a change in metaphor representation and said function call calls a certain function of the application. Each metaphor has its own collective hierarchy, whose parent is called the master and whose children are called the slaves.

The television metaphor environment built as shown in FIG. 3, by way of example, is made up of a TV set metaphor, a newspaper metaphor, a VTR controller metaphor, etc., and objects presented to the user includes a TV set, a caster, VTR controller panel, a newspaper, a clock, and so on. These are constructed in the form of a collective hierarchy of objects as shown in FIG. 4. Not only can these objects be recombined depending upon the user's preferences, but what operations are done on the objects can also be interpreted in the user's context, enabling function call to be carried out flexibly.

The following is an example of information written as the rules of common knowledge regarding each metaphor.

For instance, what may become slaves in the TV set metaphor are the channel, volume buttons, power switch, program and other metaphors. The TV set metaphor can be in either an icon state or an open state, said open state being further broken down into on and off states. In addition, the on-state includes a multi-dimensional condition expressed by the program being represented, the channel number and the sound volume level. Among the rules to be written, there are, for instance, (1) the master is asked about the program upon receiving from the channel (slave) a report that the user has given instructions on a certain channel button, (2) the program (slave) is required to be represented upon receiving from the master a request on the representation of a certain program, (3) the channel (slave) is asked to give a set of default channel numbers upon receiving from the power source (slave) a report that the user has turned it on, (4) the default program is represented upon receiving from the power source (slave) a report that the user has turned the power source on, and so on. The working memory has a master/slave hierarchy structure of each metaphor.

In most cases, the operation the user conducts on the metaphor environment may be interpreted as having several meanings. For instance, now let us consider the case where the user is opening the iconified newspaper metaphor by the mouse cursor in the television metaphor environment as mentioned above. Then, there are some possibilities, mentioned just below, about the user's task intention, i.e., what the user intends to do by opening the newspaper metaphor with the mouse cursor.

(A) The user intends to do news retrieval by a newspaper independent from the TV set metaphor.

(B) The user intends to make use of the newspaper's television program guide so as to switch program on the TV set metaphor.

(C) The user intends to review the news being now represented on the TV set metaphor in the newspaper metaphor format.

These ambiguities must be resolved on the basis of the context in which the user does their task and their preferences. In the ensuing description, reference will be made to an example in which such ambiguities are resolved by conflict or ambiguity resolution based on the variable CF and activation values referred to in the prior invention.

In the status slot area of each metaphor in the working memory, as shown in FIG. 5 information regarding the activation value is set in the television metaphor environment; information regarding the activation value, iconization and channel in the TV set metaphor; information regarding the activation value, representation/non-representation and news titles in the display metaphor; and information regarding the activation value and iconization in the newspaper metaphor.

The prior invention is designed to allow a redundancy of rules firing with respect to the same condition and event existing in the rule category of common knowledge written in one metaphor of the rule bases 51-1, ... 51-n. In the case of the newspaper metaphor, for instance, all politics, economics, living and television program columns it has as slaves may be candidates for space to be filled when it is opened up. Then, the CF value is set for each rule to incorporate therein a mechanism enabling it to change in conformity to the individual users, so that the action of each metaphor can accommodate to the individual's preferences. Such personal adaptation, which holds for the priority order of the rules firing in one metaphor, is considered to make positive use of semantic relations among the metaphors, when the user performs her or his task on the metaphor environment. For instance, the space to be filled when the newspaper metaphor is opened is affected by what state the TV set metaphor on the same metaphor environment is in.

Such influences resulting from what kind of relations exist among the metaphors can be implemented by incorporating the activation value in each metaphor and letting the activation value of a certain metaphor have an influence on resolution of conflict with the rule of other metaphor. For opening the newspaper metaphor soon after the power switch of the TV set metaphor is being turned on, for instance, it is preferred that the activation value of the TV set metaphor be so increased that the information of that activation value can accelerate selection of the rule triggering the representation of the television column.

As mentioned above, the metaphor environment control mechanism according to the applicant's prior invention is designed to write the rule of each metaphor in the rule base and store status control information about the status of each metaphor in the working memory to place the status transitions of the metaphors under control, so that the CF value and the activation value of each metaphor, that are able to be set depending upon an individual user's preferences, can be incorporated in the rules and working memory, thereby implementing actions lending themselves well fit for the user's preferences.

In the metaphor environment control mechanism stated above, the action of the displayed object is written in terms of rules which are fied by the operation of the user regarding that action. If there is conflict of rules, then it can be resolved by the activation values and CF values. However, when the conflict or the ambiguity involve personal factors, a problem arises in connection with which rule is to be selected, because the activation values and CF values have been built in the rules of the individual metaphors. In other words, which rule is to be selected is determined by what priority order is assigned thereto and so the desired rule cannot be dynamically selected while the user is in operation, making it impossible to give the priority order depending on individual differences. Another problem with this mechanism—which makes no positive use of task flow (task context)—is that there is some limit on the accuracy of ambiguity resolution, because many users tend to patternize the flow of tasks regarding a certain routine application depending on their preferences.

SUMMARY OF THE INVENTION

An object of this invention is, therefore, to provide a metaphor environment control system which enables a user to do manual operations without recourse to the designer's subjective point-of-view and enables the operational grammar to be automatically customized from those operations depending upon each user.

In order to attain the object mentioned above, the present invention provides a metaphor environment control system of human interfaces of any application program for computers, which represents a plurality of metaphors that express various functions of the application program and presents a user with a pertinent function according the user's operations, characterized by including:

an operational model for storing a user's operational information,
a world model for storing the internal states of a plurality of metaphors to be manipulated,
a display model for storing what states said plurality of metaphors are displayed in,
an operation/display control block for rewriting said operational model depending upon the user's operation and changing the representations of said metaphors pertinently depending upon a change in said display model,
an operational model/world model conversion rule for rewriting pertinent portions of said world and display models, taking a chance of a change in said operation/display control block for said operational model,
a plurality of causal rules for rewriting other portion of said world model and a pertinent portion of said display model, taking a chance of rewriting said world model, and allowing one world model to request to launch a plurality of rules, and
an ambiguity resolution block for selecting any one of said plurality of causal rules, when they are launched.

Preferably, the ambiguity resolution block includes a task intention hierarchy in which task names are arranged in the form of a hierarchy structure, said task intention hierarchy being additionally provided with task transition-limiting information for limiting the transitions of tasks expressed by task names, so that the task currently done by the user can always be identified according to the user's operations and the previous task.

Preferably, the ambiguity resolution block is operable to resolve ambiguity when that one of said plurality of causal rules requested to be launched by the user's operation can be judged with some certainty from the user's task and transition-limiting information on the current task intention hierarchy, and is operable such that if not so, it inquires of the user about ambiguity resolution.

Preferably, when the result of ambiguity resolution done after judged with some certainty is contrary to the user's own prediction, said ambiguity resolution block allows the user to give a redo command by a particular operation and when the redo command is given, said ambiguity resolution block reverts the current state back to the state where said causal rules are in conflict with each other, inquiring of the user about ambiguity resolution.

Preferably, the system further includes a personality adaptation block for creating or changing said task transition-limiting information added to said task intention hierarchy according to the result of the user's response to said inquiry about ambiguity resolution, making the ambiguity resolution done by said ambiguity resolution block slowly adaptative to the person.

According to the system of this invention which, as mentioned above, includes an operational model for storing a user's operational information, a world model for storing the internal states of a plurality of metaphors to be manipulated, a display model for storing what states said plurality of metaphors are displayed in, an operation/display control block for rewriting said operational model depending upon the user's operation and changing the representations of said metaphors pertinently depending upon a change in said display model, an operational model/world model conversion rule for rewriting pertinent portions of said world and display models, taking a chance of a change in said operation/display control block for said operational model, a plurality of causal rules for rewriting other portion of said world model and a pertinent portion of said display model, taking a chance of rewriting said world model, and allowing one world model to request to launch a plurality of rules, and an ambiguity resolution block for selecting any one of said plurality of causal rules, when they are launched, ambiguity resolution is achieved on the basis of the task context by allowing the causal rule to describe the action a certain metaphor induces by one event in plural ways and the ambiguity resolution block to select the desired one of a plurality of causal rules on the basis of the identification of the user's task intention.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIG. 1A is a block diagram of the system, and FIG. 1B shows an example of a screen of information presentation displayed on the system of FIG. 1A.

FIG. 7A shows a task intention hierarchy relating to storage of information source, and FIG. 7B shows a task intention hierarchy relating to information browsing;

DESCRIPTION OF PREFERRED EMBODIMENTS

Figure 1A:
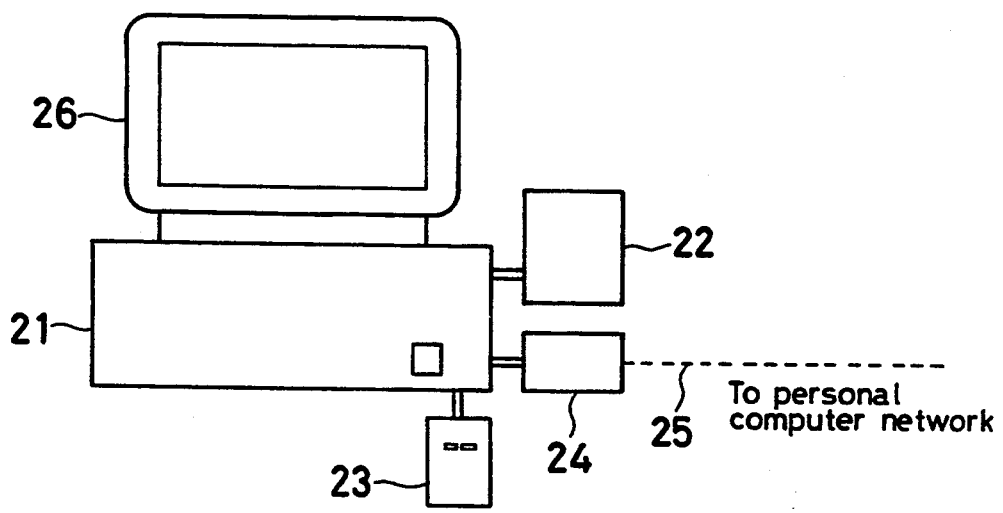
FIG. 1A and FIG. 1B each relates to a prior system, for which a patent application exists filed by the present applicant.
Figure 1B:
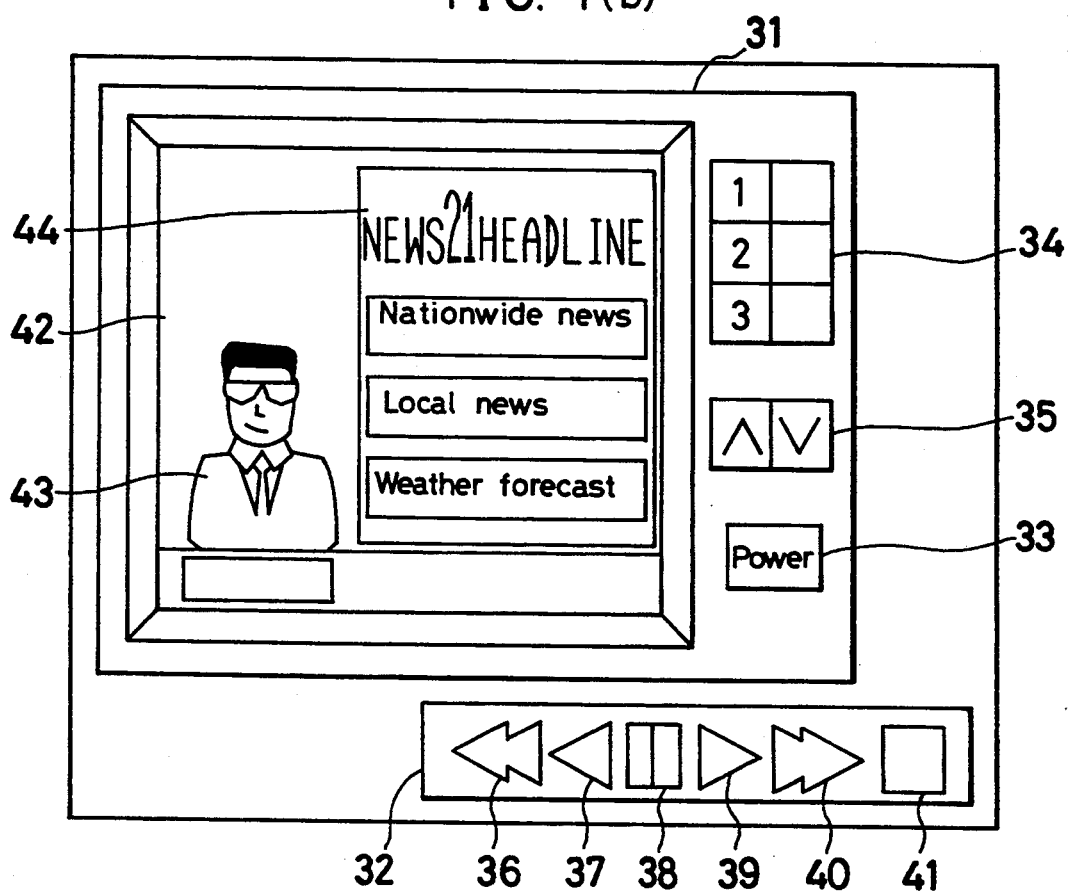
Figure 2:
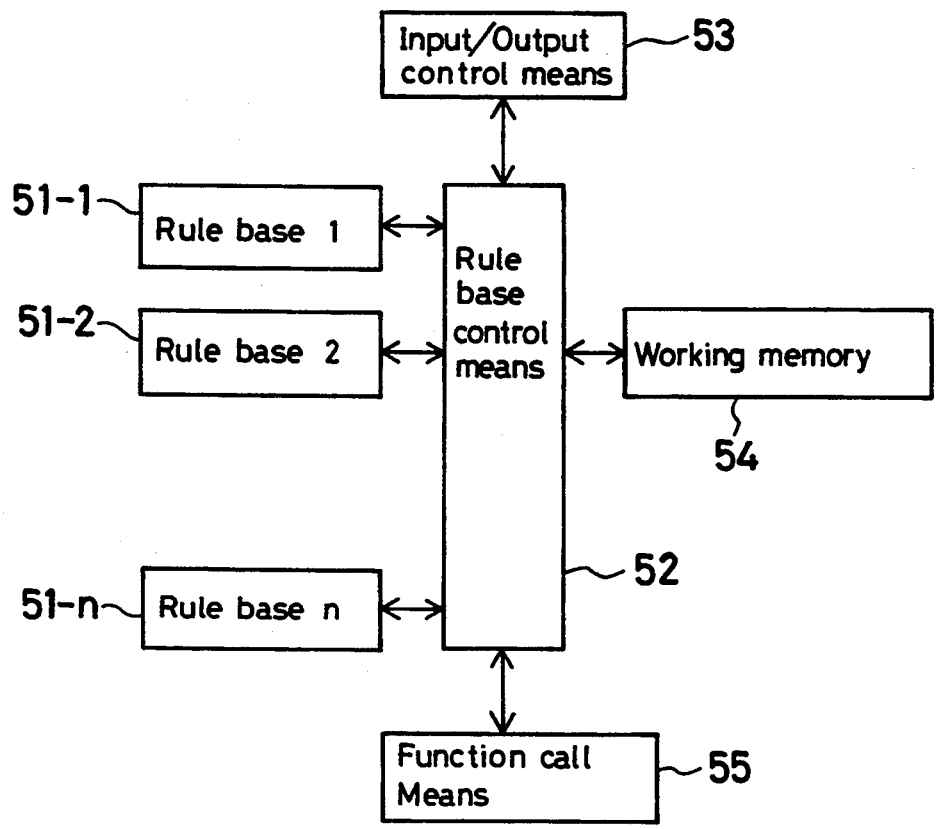
FIG. 2 is a block diagram which relates to a prior system, for which a patent application exists filed by the present applicant.
Figure 3:
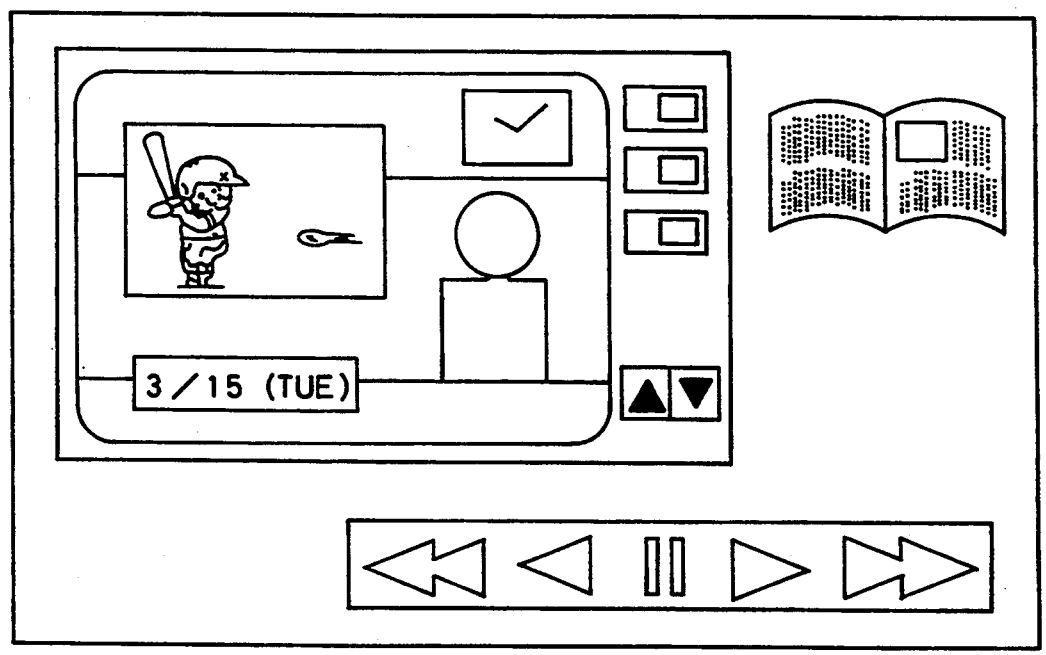
FIG. 3 is a drawing showing a television metaphor environment on screen.
Figure 4:
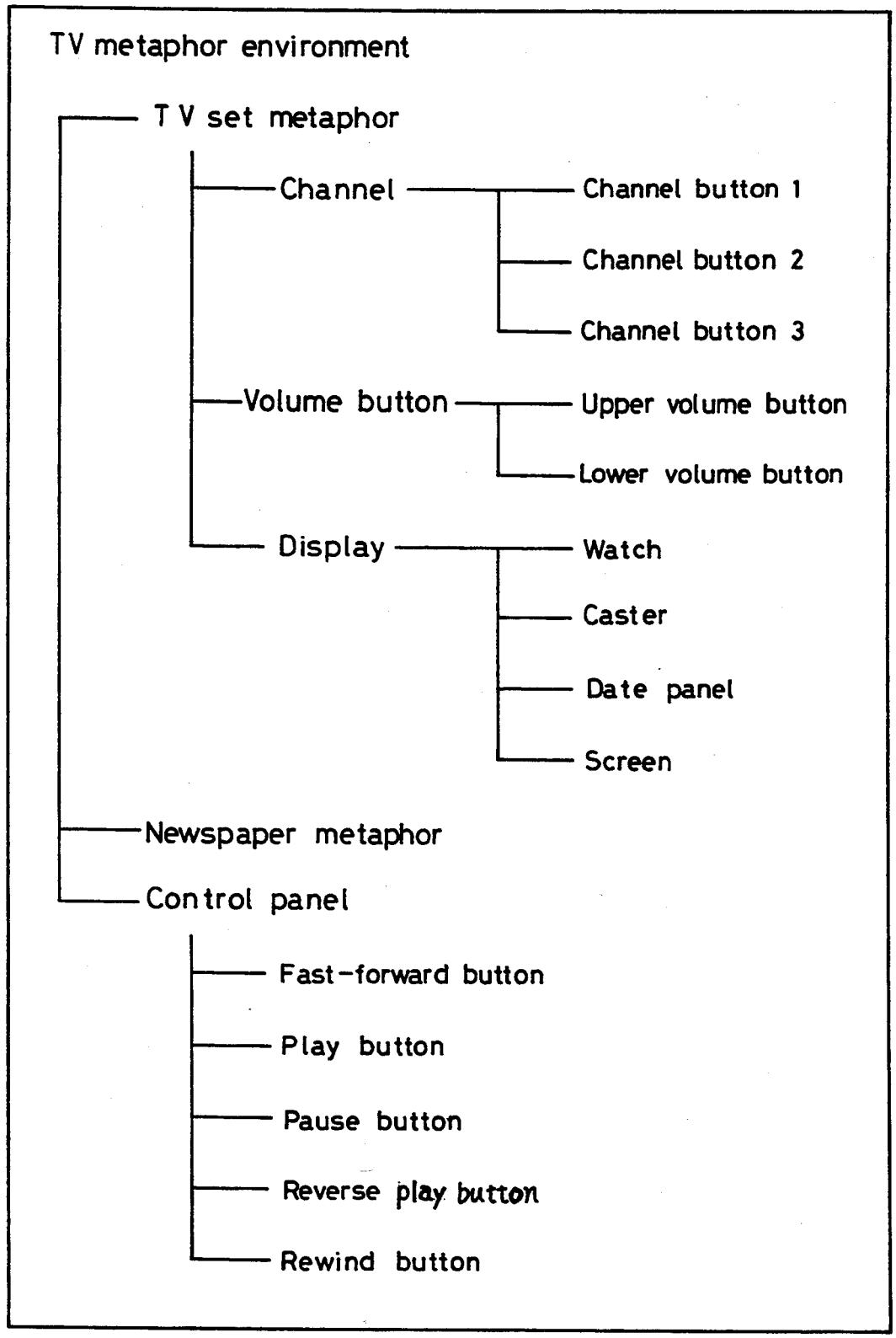
FIG. 4 shows collective hierarchy of object in television metaphor environment.
Figure 5:
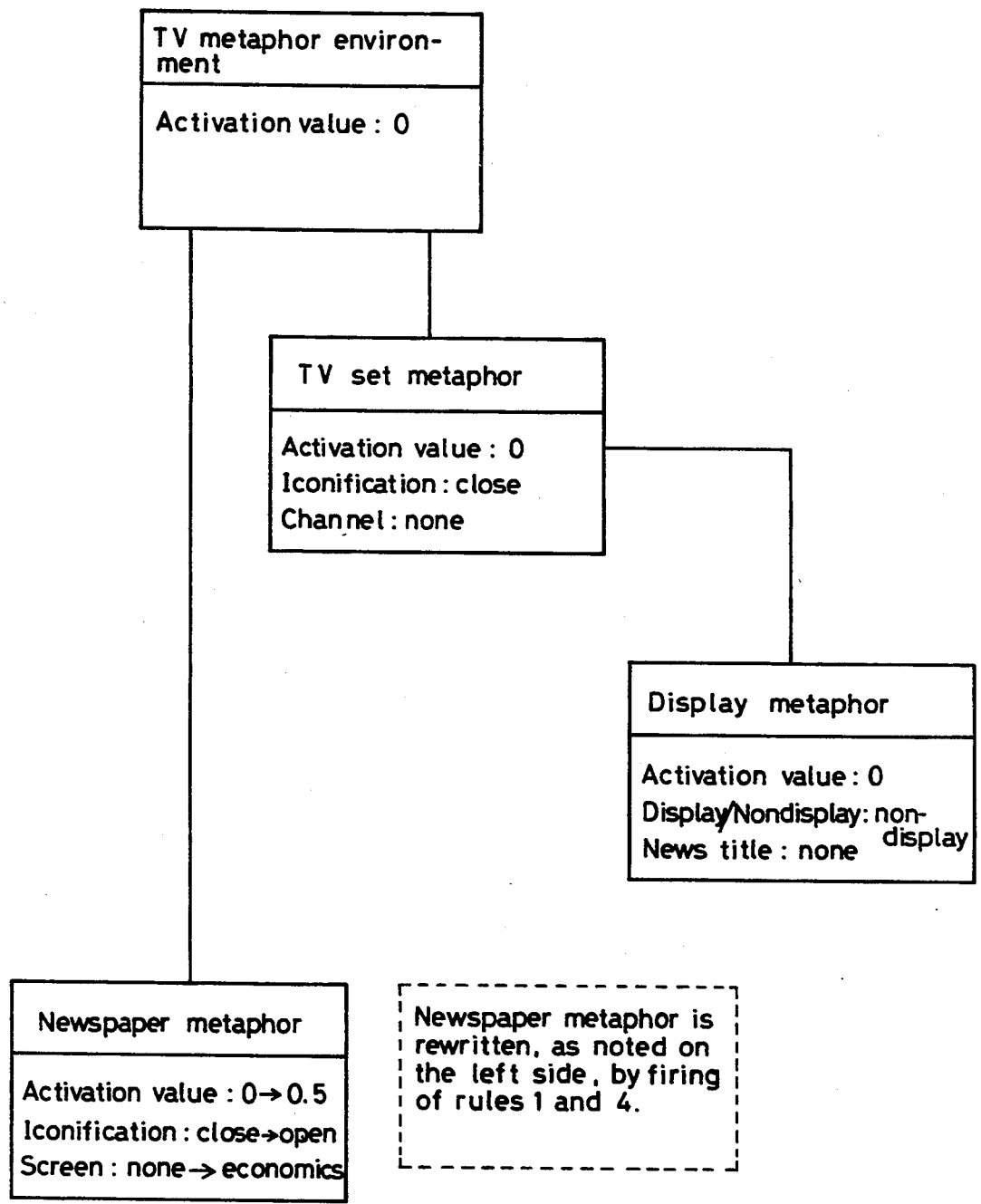
FIG. 5 shows an example of a state of working memory.
Figure 6:
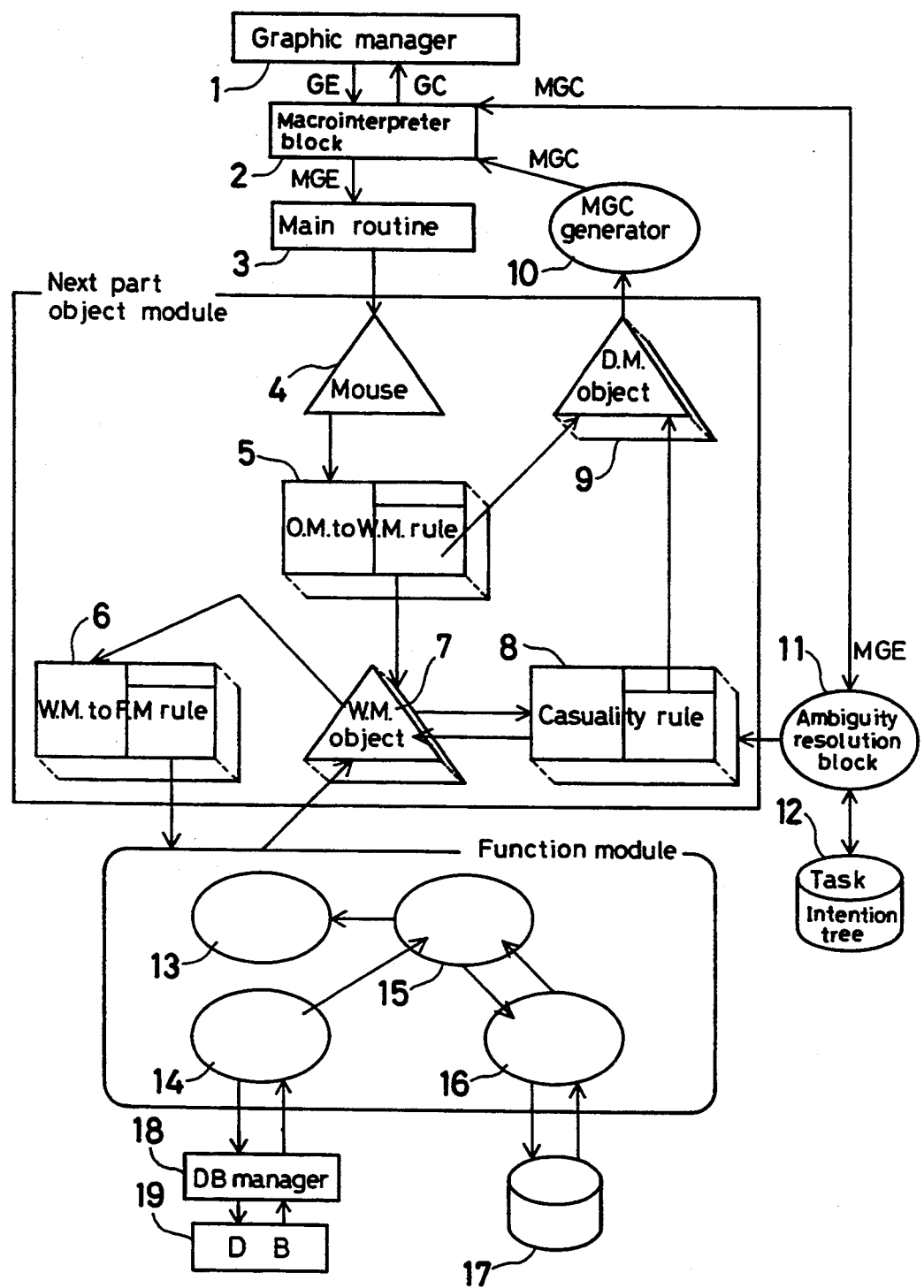
FIG. 6 represents an embodiment of a metaphor environment control system of the present invention.

Referring now to FIG. 6, a graphic manager 1 and a macrointerpreter 2 are a module adapted to handle portions of metaphors concerning "pictorial figures". The pictures of the individual metaphors are depicted by a graphic library, e.g., GMR-3D, and the actions of these as pictures take place through unique commands for Graphic control (G command/event: GC/GE and macrocommand/event: MGC/MGE).

A main routine 3, for instance, is a process for accessing the next part, in which receiving the macro G event (MGE) from the macrointerpreter 2 and transferring control to the next part occur repeatedly.

The next part object module is modeled by a user's operations on the metaphors and the resulting actions, using objects and rules.

A mouse 4 is an operational model object for storing the information of the macro G event from the macrointerpreter 2. For instance, the mouse is described as follows:

```
(@OBJECT = OM_mouse
  (@PROPERTIES =
    button . . . buttons of the mouse pressed (right,
      intermediate and left)
    discriminator . . . operation of the mouse done
      on displayed object
      (on, off, in, out, etc.)
    obj_name . . . displayed object's name
    obj_own_name . . . displayed object's own name
    path . . . displayed object's path name
```

```
    etc . . . other information
  )
)
```

A world model object 7 is an object modelling the status of each metaphor regarding, e.g., a newspaper, a news program, a television set and a control panel, designing the individual metaphors separately and making them cooperative with each other. Each metaphor incorporates the child objects of the part-of hierarchy as subobjects. When there are a plurality of homogeneous objects like news program cuts or newspaper pages, it incorporates the parent object of the is-a hierarchy as a class object. For instance, the television set metaphor is described as follows:

```
(@OBJECT = TV_set_metaphor
  (@SUBOBJECT =
    . . . to define the child objects in the Part-of
      hierarchy
    Channel_metaphor
    Vol_sw
  )
  (@PROPERTIES =
    program . . . program title now on display
    status . . . status of television set metaphor
      (open, close)
    volume . . . sound volume value (an integer of 0 to 10)
  )
)
```

A display model object 9 is an object for storing information about the objects on display, and the information stored there is the argument of the macro G command created by a macro G command generator 10. For instance, the television set is described as follows:

```
(@OBJECT = DM_tv_set
  (@PROPERTIES =
    vol_button . . . parameter for showing what status the volume
      button is pressed in
    vol_bar . . . parameter for indicating what is indicated by
      the volume bar
    channel . . . parameter for showing what status the channel
      is pressed in
    channel name . . . to allocate the channel number to the
      the channel button
    display . . . parameter indicating display/nondisplay
    iconify . . . parameter indicating iconification
    name . . . parameter indicating schema name
    vol_button_name . . . parameter indicating the volume
      button's own name
    default_no . . . number for control
  )
)
```

O.M. to W.M. rules 5 are to reflect the contents of the operational model object (mouse) 4 on the world model objects 7, and are transmitted from the operational model object 4 to the world model objects 7 by letting a two- or three-stage rules fire forward. Some parts of the action on the right side serve to change the contents of the property of the display model object as well. The first stage plays a role in allocating the events on the operational model to each metaphor, and uses the information of the OM mouse._ob name slot of the operational model object to judge which metaphor has that event. At the final stage, the slot contents of the world model object and some display model objects are rewritten in correspondence to the contents of the events on the operational model object. Since these rules are again and repeatedly used by the next user's operation, they are required to have got a hypothesis reset. Unless these were reset, then the next part would not fire any pertinent rule, because they keep intact the hypothetical true-value state determined by the former user's operation.

W.M. to F.M. rules 6 are provided to call the function modules from the contents of the world model object 7. Here metaphor/function separation is implemented.

Cause-and-effect or causal rules 8 are provided to describe the sequence of cause and effect of the properties of the world model objects 7. Some parts of the actions on the right side serve to change the contents of the properties of display model object 9 as well. And a plurality of sequences of cause and effect to be fired by a user's single operation are provided, whereby a metaphorical action might have multiple meanings and the ambiguities are resolved in a conflict or ambiguity resolution block 11.

When the causal rules 8 have a plurality of subrules capable of firing, the ambiguity resolution block 11 performs the following operations.

(1) If a task intention tree 12 had predicted a correct solution of a certain or higher probability to current conflict, then this conflict should be resolved according to that prediction.

(2) If not so, then the user is presented with candidates now in conflict in menu form and requested to select the desired one therefrom. And based on the user's selection, the task intention tree 12 is created or corrected.

(3) If the user gives a redo command to the result of conflict resolution done according to the prediction, then the world model objects 6 are restored to the original state to do the same as mentioned in (2).

In order for the user to achieve equivocal interpretation of a certain metaphor, the causal rules 7 allow the action that metaphor induces by a single event to be described in plural ways. Then, ambiguity is resolved on the basis of the task context by letting the ambiguity resolution block 11 select the desired one from a plurality of causal rules based on the identification of the user's intention.

A function module is a group of functions capable of doing actual tasks for retrieving information from an on-line data base and storing the retrieved data as a local file. By way of example alone, reference may be made to such function modules as an article selector 14, an article collector 15, an article storer/retriever 16 and a mapper 13.

The article selector 14 is provided to create and transmit a query sentence for applying inquiry to the on-line data base in launching a news program and calling a newspaper and receive an answer thereto. The article collector 15 is used to manage an article retrieved by the article selector 14 on a memory in some format. It may also be used to store the articles presented to the user in the past and collect the differential alone. The article storer/retriever 16 serves to store the contents of the articles collected in the article collector 14 in a local file and remove them out of it. The mapper 13 functions to allocate the articles collected by the article collector 14 onto metaphors.

The causal rules describe actions occurring in association with the rewriting of slots of the world model objects. Included in these actions are changing other slots of the world mode object and slots of the display model object, accessing the function modules, and so on.

The actions induced by the final stage of the O.M. to W.M. rules involve multiple meanings. Set out below, for instance, is an ambiguity list of a television set metaphor.

```
(HYPO = Open_TV_set)
(@RHS =
    (Let (TV_set_metaphor. status)
    ("open")
)
→
. See a new news
 OPEN TV_SET
 SHOW (a new NEWS_PROGRAM)
 . See the same news from the beginning
 OPEN_TV_SET
 SHOW (the new NEWS_PROGRAM)
    ((at the beginning))
 . See the news from where seen just before
 OPEN TV_SET
 SHOW (the new NEWS_PROGRAM)
    ((at the previous place))
 . See an unwatched news
 OPEN TV_SET
 SHOW (the new NEWS_PROGRAM)
    ((at yet unwatched))
```

The O.M. to W.M. rule involves at its terminal launching operation for rewriting the slots of the objects by RHS and a selecting operation for leaving "HYPO: Select objectname" intact.

For the launching operation, "HYPO: IC_object slot" is first hit in the "If Change metaslot" of the object slots. This is because it is required to have got "Conditional IC" set, where the rules are filed depending upon how the slot is rewritten. Then, the "HYPO: IC_object slot" rule accesses the ambiguity resolution block as using the "HYPO: CR_conflictrules" as an argument, followed by firing the "HYPO: CR_conflictrules". The ambiguity resolution block retrieves the "HYPO: CR_ conflictrules" given as the argument. If there is one rule, then retrieval is completed. If not so, then information "COMMENTS" is elicited to present the user with a menu. Or the ambiguity resolution block itself resolves ambiguity. Other CR_conflictrules which are not selected are set at −20000 or less in terms of category atom.

In the case of the selecting operation, two "HYPO: Select_objectnames" are provided for the O.M. to W.M. rule, because it is intended to divide the just-before inference cycle into two cases, one in which the same object is selected and the other in which different objects are selected (this is because it is desired that selecting the same object twice running in sequence carries out a reset action. The object selected in the just-before inference cycle is stored in a variable "Selected_Slot".

In the ensuing description, reference will be made to how to acquire the task intention hierarchy automatically.

Figure 7:
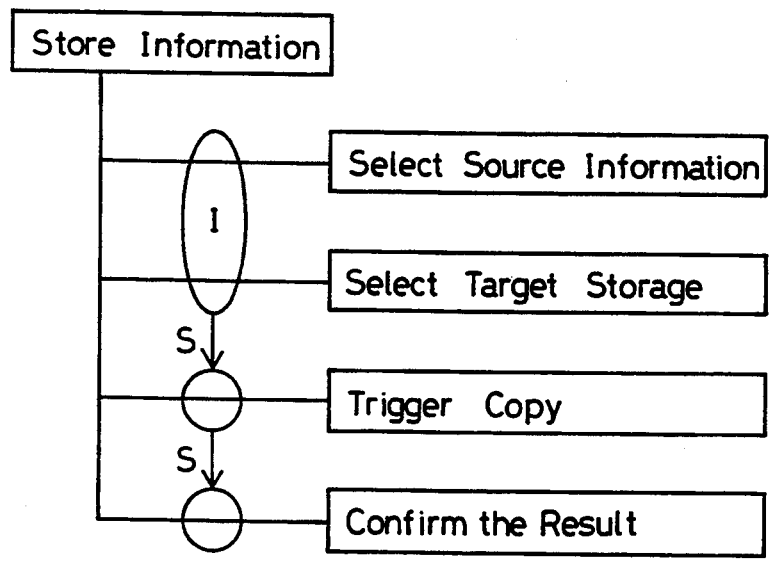
FIG. 7A and FIG. 7B each represents an example of task intention hierarchy according to the present invention.
Figure 7:
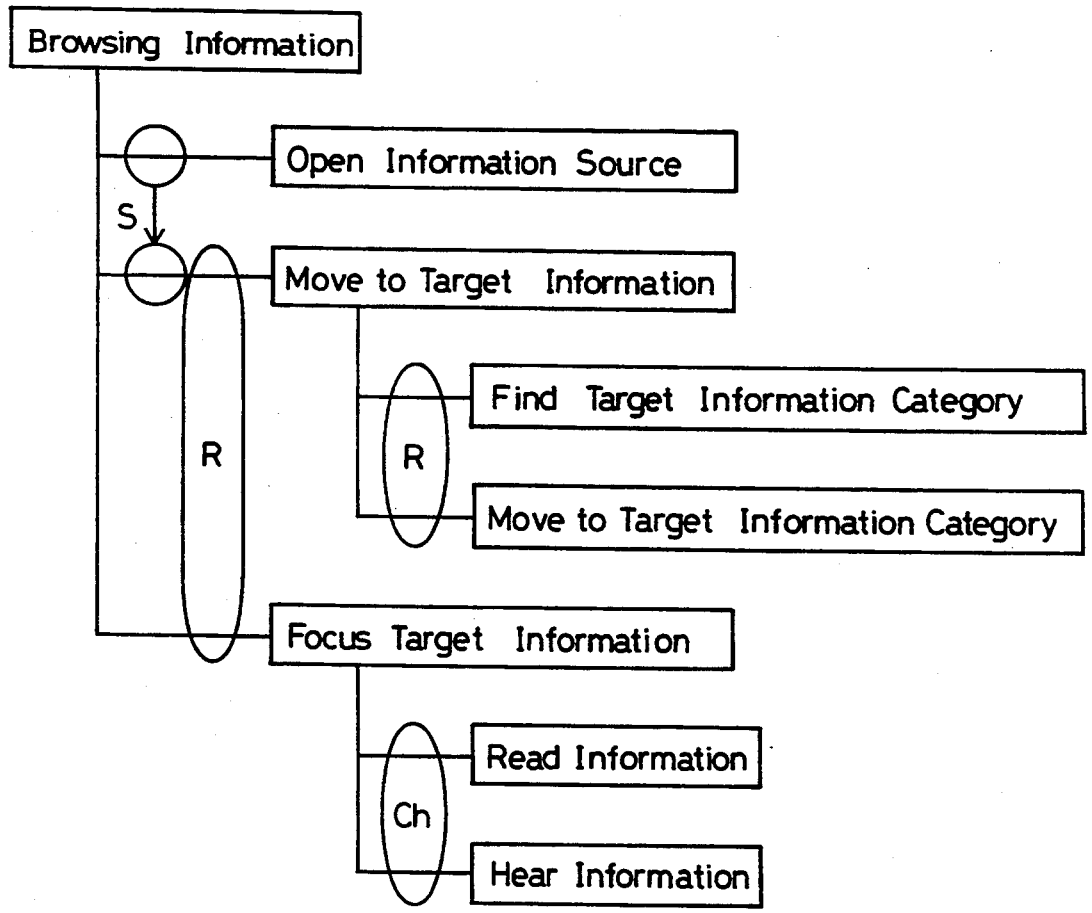

The task intention hierarchy is expressed as such a tree structure as shown in FIG. 7A and FIG. 7B, in which the nodes are task names and the links are the relations between goals and subgoals. Usually, five kinds of subgoals underlie a certain goal, and there are the following five relations among the subgoals:

(1) Sequential dependency: the sequential relation between two goals (shown by S in FIG. 7A and FIG. 7B;
(2) Goal independence: independent on the sequential relation (shown by I in FIG. 7A);
(3) Choice: only one goal is selected from several goals (shown by Ch in FIG. 7A);
(4) Conditional goals: several goals are executed one after another, and until one of the goals ends successfully; and
(5) Repetitive goals: several goals are executed one after another, and its cycle is repeated until one of the goals fails (shown by R in FIG. 7B).

For achieving personal adaptation, the following things are performed in this invention.

Figures 8, 9:
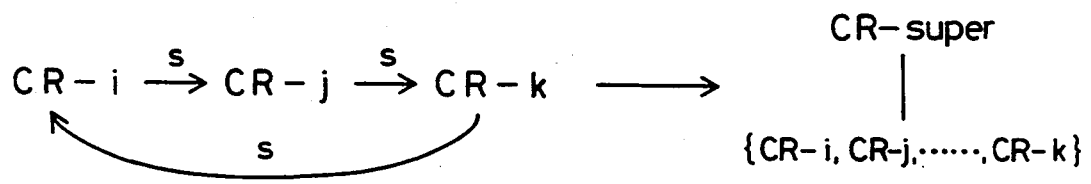
FIG. 8 shows a configuration example of totalization table.
FIG. 9 is a drawing for explaining extraction of repeat goal set.

First, "Sequential Goals" are found out as Step 1. To this end, regarding the rule written in the knowledge and beginning with CR there is provided such a table as shown in FIG. 8 in the ambiguity resolution block, so that the number of times and probability in and at which the CR rule is used continuously can be totalized. And if the number of times exceeds the predetermined minimum effective cycle and the probability exceeds the predetermined minimum probability, then that pair is regarded as "Sequential Goals".

Then, "Repetitive Goals" and "Conditional Goals" are found out as Step 2. While both are common to each other in that a plurality of goals are repeated, the former is designed such that "if one goal is achieved, then the next is executed" and the latter such that "if goals fail, then execution is continued but if one goal is achieved, then execution is brought to an end". Note, however, that both cannot simply be distinguished from each other. Nor, in many cases, can achievement and failure of goals be objectively determined unlike programs, because this is often subject to the user's own judgement.

For those reasons, here no distinction is made between both. Nor is the interruption of repetition positively taken into consideration. In addition, it is assumed that the possibilities of escaping from repetition are equal in all the goals involved.

To be specific, of the "Sequential Goals" found by Step 1, one having a repeating chain unit shown in FIG. 9 is extracted as "a repeating goal set". In addition, the repeating goal sets are grouped as a super goal. At this time, the CRs being elements of the repeating goal set are substituted by the super goal in the table shown in Table 8. During this, a chain of CR-super—CR-super is deleted.

Furthermore, "Choice" is found out as Step 3. In the table shown in FIG. 8, if one CR (e.g., CR-i) follows a plurality of CRs (e.g., CR-1, CR-m and CR-n) and none of them reaches the probability frequency well enough for "being sequential", then CR-1, CR-m, CR-n, etc. may possibly be either "Choice" or "Independent".

A difference between "Choice" and "Independent" may result from whether probability frequencies are high enough or low enough, as expressed by:

CR-1→CR-m, CR-m→CR-1

CR-1→CR-m, CR-m→CR-1

CR-m→CR-n, CR-m→CR-m.

High and low probability frequencies may be considered as "Independent" and "Choice", respectively. If there are goal sets that may be regarded as "Independent" and "Choice", then they are grouped as a super goal. At this time, the CRs being elements of the goal sets are all substituted by the super goal in the table shown in Table 8, as is the case with Step 2.

The above-mentioned formats may be summarized up as algorithm, as set out just below.

First, initialization is done. For initialization, the following processings (1)–(6) are performed.
(1) CR_MAX is let denote the total number of rules beginning with CR, contained in the metaware rules.
(2) SEQ_MIN is let denote the minimum value of probability frequencies for finding out "Sequential Goals".
(3) CHO_MIN is let denote the minimum value of probability frequencies for finding out "Choice".
(4) IND_MAX is let denote the maximum value of probability frequencies for finding out "Independent".
(5) Declaration of Table

```
CR_TABLE[CR_MAX]{
    NEXT_CR[CR_MAX],
    TIMES[CR_MAX]
    PROBABILITY[CR_MAX]
}
```

(6) CR_PREV is let denote the variable in which the previously executed CR is preserved.

Whenever ambiguity occurs in the inference block following the initialization stated above, the following processings are performed.

Investigation is made of a set of CRs (called the ambiguity set) in which ambiguity is being produced (Step S1).

For each CR of the ambiguity set, the following steps S2–S7 are done one after another. If achieved, then Step S9 is performed. If they fail, then the user is presented with a menu for selecting the desired one from the ambiguity set, followed by carrying out Step S9.

If there is a CR in which CR_PREV linked to the "Sequential" link, then it is executed (Step S2).

If there is a CR next to CR_PREV in the CR_PREV containing "Cyclic" set, then it is executed (Step S3).

If there is a CR contained in the CR_PREV containing "Independent" set, then it is executed (Step S4).

If there is a CR in which the super goal of the CR PREV containing "Cyclic", "Independent" and "Choice" sets is linked to the "Sequential" link, then it is executed (Step S5).

If there is a CR next to the super goal in the "Cyclic" set containing the super goal of the CR PREV containing "Cyclic", "Independent" and "Choice" sets, then it is executed (Step S6).

If there is a CR contained in the "Independent" set containing the super goal of the CR PREV containing "Cyclic", "Independent" and "Choice" sets, then it is executed (Step S6).

If the CR is contained in any one of all the "Cyclic", "Independent" and "Choice" sets, then its own ID is substituted by its super goal, and if its own ID is already found in NEXT_CR of CR_TABLE[ID_of_CR_PREV] in CR_TABLE, then TIMES and PROBABILITY are rewritten by calculation. If there is still nothing, registration is newly made (Step S9).

And the finding-out and registration of the "Sequential" pair, "Cyclic" set, "Choice" set and "Independent" set are done.

The "Sequential" pair makes registration as to PROBABILITY more than SEQ_MIN according to Step S1. The "Cyclic" set is extracted from the "Sequential" pair according to Step S2, and the "Choice" and "Independent" sets are extracted according to Step S3. Then, their respective super goals are set with a certain unique ID to rewrite the table.

According to the invention described above, in order for the user to achieve unequivocal interpretation of a certain metaphor, ambiguity is resolved by allowing the causal rules to describe the action the metaphor induces by a single event in plural ways and letting the ambiguity resolution block select the desired one from a plurality of causal rules based on the identification of the user's intention. In different contexts, one user has different operational intentions with respect to the same metaphor. And the flow of the user's task context can be expressed as a trace of the task intention hierarchy expressed in the goal/subgoal format and the flow of the task context of tasks done by a particular user has a certain predetermined pattern. According to this invention, therefore, a standard task intention hierarchy is first provided, and the task intention underlying the user's operations is then identified. Finally, additional information is added to the first standard task intention hierarchy to make it well fit for the person.

As described above, the present invention has a number of effects. Among them:

(1) Separation between Expression and Knowledge

In a metaphor environment, a portion as a "pictorial figure" displayed on the display screen is separated from a portion as "knowledge" that defines the action of the "pictorial figure" symbolically, thereby customizing the action of the metaphor and making the system automatically well adaptable to an individual user.

(2) Separation between Function and Metaphor

"Knowledge" that defines the action of a metaphor symbolically is separated from a "function" that does actual operations, thereby making it possible to access the function based on a task context.

(3) Separative Design and Cooperative Operation of Metaphors

Individual metaphors are so separately designed that they can be incorporated in a metaphor environment in an arbitrary combination, thereby implementing a composite or multiple metaphor environment.

(4) Achievement and Resolution of Ambiguity of Metaphorical Action

The action of a metaphor is symbolically defined in terms of "knowledge" referred to in (1), but the action of a metaphor that the user predicts is considered to have multiple meanings. Not only can the metaphor be defined while leaving this ambiguity intact, but this ambiguity can also be resolved according to a task context.

(5) Achievement of Personal Adaptation

Ambiguity resolution referred to in (4) may be achieved according to a task context, but it is difficult to consider that the same task context is provided for every user. In order to solve this problem, the system lends itself well fit for how an individual user does work.

What we claim is:

1. A metaphor environment control system of human interfaces of any application program for computers, which represents a plurality of metaphors that express various functions of the application program and presents a user with a pertinent function according to the user's operations comprising:

a computer having a memory;
   wherein said memory contains an operational model which stores a user's operational information;
   a world model which stores the internal states of a plurality of metaphors to be manipulated;
   a display model which stores states in which said plurality of metaphors are displayed;
   an operation/display control block which rewrites said operational model depending upon the user's operation and changes the representations of said metaphors pertinently depending upon a change in said display model;
   an operational model/world model conversion rule which rewrites pertinent portions of said world and display models, using a change as a trigger in said operation/display control block for said operational model;
   a plurality of causal rules which rewrite other portions of said world model and a pertinent portion of said display model, using rewriting as a trigger in said world model, and allowing one world model to request to launch a plurality of said causal rules; and
   an ambiguity resolution block which selects any one of said plurality of causal rules, when they are launched.

2. A metaphor environment control system as claimed in claim 1, wherein said ambiguity resolution block includes a task intention hierarchy in which task names corresponding to the user's operations are arranged in the form of a hierarchy structure, said task intention hierarchy being additionally provided with task transition-limiting information for limiting the transitions of tasks expressed by task names, so that whatever task is currently done by the user can always be identified according to the user's operations.

3. A metaphor environment control system as claimed in claim 1, wherein said ambiguity resolution block operates to resolve ambiguity when that one of said plurality of causal rules requested to be launched by the user's operation which has been selected can be judged with some certainty from the user's task and transition-limiting information on the current task intention hierarchy, and operates such that if it cannot be judged with some certainty, it inquires of the user about ambiguity resolution.

4. A metaphor environment control system as claimed in claim 1, wherein when the result of ambiguity resolution is contrary to the user's own prediction, said ambiguity resolution block allows the user to give a redo command by a particular operation and when the redo command is given, said ambiguity resolution block reverts the current state back to the state where said causal rules are in conflict with each other, inquiring of the user about ambiguity resolution.

5. A metaphor environment control system as claimed in claim 3, wherein said memory further contains a personality adaptation block which creates or changes said task transition-limiting information added to said task intention hierarchy according to the result of the user's response to said inquiry about ambiguity resolution, making the ambiguity resolution done by said ambiguity resolution block slowly adaptive to a person.

* * * * *